(12) United States Patent
Yue

(10) Patent No.: US 8,480,154 B2
(45) Date of Patent: Jul. 9, 2013

(54) CLAMP STRUCTURE FOR TONNEAU COVER OF PICK-UP TRUCK

(75) Inventor: Shiawdar Shaun Yue, Cupertino, CA (US)

(73) Assignee: CYC Engineering, Inc., Fremont, CA (US)

( * ) Notice: Subject to any disclaimer, the term of this patent is extended or adjusted under 35 U.S.C. 154(b) by 223 days.

(21) Appl. No.: 13/097,039

(22) Filed: Apr. 28, 2011

(65) Prior Publication Data

US 2012/0274092 A1    Nov. 1, 2012

(51) Int. Cl.
*B60J 7/02*    (2006.01)

(52) U.S. Cl.
USPC .................................................. 296/100.07

(58) Field of Classification Search
USPC ............. 296/100.06, 100.07, 100.09, 100.12, 296/100.16, 100.17, 100.18, 104, 100.02, 296/100.03, 100.04, 100.01; 248/503
See application file for complete search history.

(56) References Cited

U.S. PATENT DOCUMENTS

| 5,263,761 | A | * | 11/1993 | Hathaway et al. | 296/100.18 |
|---|---|---|---|---|---|
| 5,275,458 | A | * | 1/1994 | Barben et al. | 296/100.18 |
| 5,460,423 | A | * | 10/1995 | Kersting et al. | 296/100.18 |
| 5,472,256 | A | * | 12/1995 | Tucker | 296/100.18 |
| 5,857,729 | A | * | 1/1999 | Bogard | 296/100.09 |
| 6,129,407 | A | * | 10/2000 | Kooiker | 296/100.07 |
| 6,152,513 | A | * | 11/2000 | Karrer | 296/37.6 |
| 6,257,647 | B1 | * | 7/2001 | Ninness et al. | 296/100.15 |
| 7,258,387 | B2 | * | 8/2007 | Weldy | 296/100.07 |
| 8,256,824 | B2 | * | 9/2012 | Williamson et al. | 296/100.16 |
| 2006/0208524 | A1 | * | 9/2006 | Brown et al. | 296/100.01 |
| 2008/0197663 | A1 | * | 8/2008 | Smith | 296/100.01 |
| 2010/0270824 | A1 | | 10/2010 | Yue | |

* cited by examiner

*Primary Examiner* — Glenn Dayoan
*Assistant Examiner* — Pinel Romain

(57) ABSTRACT

A clamp structure for a tonneau cover of a pick-up truck is disclosed and mounted to one frame section of a tonneau cover for releasably securing the frame section on a side wall of a cargo bed of the pick-up truck. The clamp structure has a composite grip element which has a metal grip body and a plastic sleeve. The metal grip body has an engaging portion to stably engage with the side wall of the pick-up truck. The plastic sleeve has a first abutment flange to smoothly abut against a turning handle, and a second abutment end facing a sliding block. Thus, the composite grip element can provide advantages of both of metal and plastic material, so that the operational stability and reliability of the clamp structure can be enhanced, and the lifetime thereof can be elongated.

14 Claims, 8 Drawing Sheets

CLAMP STRUCTURE FOR TONNEAU COVER OF PICK-UP TRUCK

FIELD OF THE INVENTION

The present invention relates to a clamp structure for a tonneau cover of a pick-up truck, and more particularly to a clamp structure for a tonneau cover of a pick-up truck having a composite grip element.

BACKGROUND OF THE INVENTION

A pick-up truck has a cargo bed used to carry various cargos. Generally, the cargo bed is covered by a tonneau cover which is releasably clamped to and extended above the cargo bed, so as to protect the carried cargos from adverse weather and improve the aesthetic appearance of the pick-up truck. The tonneau covers can be classified into hard-top type and soft-top type, wherein the hard-top type tonneau cover has a hard top made of metal, fiberglass or the like, while the soft-top type tonneau cover has a soft top made of canvas, vinyl plastic or a weather-resistant fabric.

In general, although the hard-top tonneau cover provides greater security for cargo and can be more easily clamped on the cargo bed of the pick-up truck, it is heavier than the soft-top tonneau cover, and it needs more storage space for storing the hard-top tonneau cover after being removed from the pick-up truck. Furthermore, the soft-top tonneau cover is lighter in weight, and the volume thereof is more compact for storage. Meanwhile, both of the hard-top tonneau cover and the soft-top tonneau cover need to provide clamps for securely clamping the tonneau cover to the pick-up truck.

For example, referring now to FIG. 1, U.S. Patent Application Publication No. 2010-0270824 discloses a clamp structure for a tonneau cover 91, mounted to one of at least two frame sections 92 of the tonneau cover 91 for releasably securing the frame sections 92 on a side wall 93 of a cargo bed of a pick-up truck, the clamp comprises: a foundation rail 94 connected to one of the frame sections 92, and having two side grooves 941 formed on two side surfaces of the foundation rail 92, and a recess 942 formed between the two side grooves 941; a sliding block 95 having two side hangers 951 extended into the two side grooves 941 and slidably moving along the two side grooves 941, and a pivotal portion 952 received in the recess 942; a clamp bolt 96 having a first pivotal end 961 pivotally connected to the pivotal portion 952 of the sliding block 95, and a second pivotal section 962; a grip element 97 movably mounted on the clamp bolt 96 and having an engaging portion 971; and a handle 98 pivotally connected to the second pivotal section 962 of the clamp bolt 96 and having a cam surface 981 to abut against the grip element 97, so as to control the engaging portion 971 of the grip element 97 to engage with a surface of the side wall 93 of the pick-up truck.

In this traditional clamp structure, the grip element 97 is generally made of metal, engineering plastic or other equivalent rigid material. However, when the grip element 97 is only made of metal which is rigid without elastically deformable property, it is relatively difficult for the cam surface 981 of the handle 98 to smoothly abut against the grip element 97. Meanwhile, because the engaging portion 971 of the grip element 97 engages with the surface of the side wall 93 too tightly, there will be a risk of damaging the surface of the side wall 93. After long-term use, the cam surface 981, the grip element 97 and/or the surface of the side wall 93 may thus deform or be damaged, so as to increase the installation distance between the cam surface 981 and the grip element 97 or the engagement distance between the grip element 97 and the side wall 93, resulting in a loose or invalid clamping relationship thereof.

On the other hand, when the grip element 97 is only made of engineering plastic which has a certain elastically deformable property, the cam surface 981 of the handle 98 may abut against a pair of sliding grooves of the grip element 97 too tightly, so that the cam surface 981 of the handle 98 may accidentally depart from the sliding grooves (unlabeled) of the grip element 97. Meanwhile, because it has no sufficient structural strength for the engaging portion 971 of the grip element 97 to stably engage with the surface of the side wall 93, there will be a risk of damaging the engaging portion 971 of the grip element 97. After long-term use, the cam surface 981, the grip element 97 and/or the surface of the side wall 93 may thus deform or be damaged, so as to increase the installation/engagement distance and cause a loose or invalid clamping relationship.

As a result, it is important for related designers and manufacturers to think how to develop a clamp structure for a tonneau cover of a pick-up truck, in order to solve the problems existing in the conventional clamps, as described above.

SUMMARY OF THE INVENTION

A primary object of the present invention is to provide a clamp structure for a tonneau cover of a pick-up truck, wherein the clamp structure has a composite grip element which comprises a metal grip body and a plastic sleeve, the metal grip body has an engaging portion to stably engage with a surface of a side wall of the pick-up truck, and the plastic sleeve has a first abutment flange to smoothly abut against a turning handle and a second abutment end facing a sliding block. Thus, the composite grip element can provide advantages of both of metal and plastic material, so that the operational stability and reliability of the clamp structure can be enhanced, and the lifetime thereof can be elongated.

A secondary object of the present invention is to provide a clamp structure for a tonneau cover of a pick-up truck, wherein a second abutment end of the plastic sleeve of the composite grip element has a width greater than that of a notch of the sliding block, and thus the second abutment end of the plastic sleeve smoothly slides along a surface edge of the notch of the sliding block, so as to prevent the metal surface of the metal grip body from being directly in contact with the surface of the sliding block to cause harsh noise or surface abrasion.

A third object of the present invention is to provide a clamp structure for a tonneau cover of a pick-up truck, wherein a hollow portion of the metal grip body is transversely formed in the metal grip body and communicated with an installation hole of the metal grip body, and the plastic sleeve actually passes through the installation hole and the hollow portion, wherein the hollow portion provides a certain slightly elastically deformable property to the metal grip body, so as to prevent from generating excess engagement force toward the side wall of the pick-up truck to avoid the abrasion of the side wall and the engaging portion.

A fourth object of the present invention is to provide a clamp structure for a tonneau cover of a pick-up truck, wherein the composite grip element can be easily replaced by another backup composite grip element having a backup metal grip body with a different specification, so that the clamp structure can be rapidly changed and applied to a side wall of another pick-up truck with the different specification. Thus, the application flexibility of the clamp structure can be expanded.

A fifth object of the present invention is to provide a clamp structure for a tonneau cover of a pick-up truck, wherein a foundation rail has a T-shape insertion block to be movably inserted into an insertion groove of an outer rail of a frame section, and a recess of the foundation rail has an inclined depression close to the T-shape insertion block, wherein a screw is received in the inclined depression and passes through the T-shape insertion block to screw-connect to an inner surface of the insertion groove of the frame section, so that a quick installation can be carried out.

To achieve the above object, a preferred embodiment of the present invention provides a clamp structure for a tonneau cover of a pick-up truck, which is mounted to one of at least two frame sections of the tonneau cover, wherein the clamp is used to releasably secure the frame sections on a side wall of a cargo bed of the pick-up truck, wherein the clamp structure comprises: a foundation rail connected to one of the frame sections, and having two side grooves formed on two side surfaces of the foundation rail, and a recess formed between the two side grooves; a sliding block having two side hangers extended into the two side grooves and slidably moving along the two side grooves, and a pivotal portion received in the recess; a clamp bolt having a pivotal end pivotally connected to the pivotal portion of the sliding block, and a thread end; a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing the sliding block; and a turning handle rotatably and movably connected to the thread end of the clamp bolt, and having a push surface to smoothly abut against the first abutment flange of the plastic sleeve of the composite grip element, so as to control the engaging portion of the composite grip element to stably engage with the side wall of the pick-up truck.

In one embodiment of the present invention, the sliding block further comprises a notch which is extended from a lower surface of the sliding block to one side surface thereof, and the clamp bolt can be shifted into the notch to move to a storage position.

In one embodiment of the present invention, the second abutment end of the plastic sleeve of the composite grip element has a width greater than that of the notch of the sliding block, and thus the second abutment end of the plastic sleeve smoothly slides along a surface edge of the notch of the sliding block.

In one embodiment of the present invention, one of the side surfaces of the foundation rail further comprises an indentation which is communicated with the recess, and the clamp bolt can be shifted into the indentation to move to the storage position.

In one embodiment of the present invention, the notch of the sliding block is aligned with the indentation of the foundation rail when the clamp structure is in the storage position; and the pivotal portion of the sliding block is received in the recess of the foundation rail without contacting an inner surface of the recess.

In one embodiment of the present invention, the metal grip body has a hollow portion transversely communicated with the installation hole, and the plastic sleeve passes through the installation hole and the hollow portion.

In one embodiment of the present invention, the composite grip element has a backup metal grip body having an engaging portion with a size different from that of the engaging portion of the metal grip body, and the metal grip body can be replaced by the backup metal grip body.

In one embodiment of the present invention, the foundation rail is connected to an outer rail of one of the frame sections and has a T-shape insertion block to be movably inserted into an insertion groove of the outer rail; and the recess of the foundation rail has an inclined depression close to the T-shape insertion block, wherein a screw is received in the inclined depression and passes through the T-shape insertion block to screw-connect to an inner surface of the insertion groove of the outer rail.

Furthermore, another preferred embodiment of the present invention provides a clamp structure for a tonneau cover of a pick-up truck, which is mounted to a single frame section of the tonneau cover, wherein the clamp is used to releasably secure the frame section on a side wall of a cargo bed of the pick-up truck, wherein the clamp comprises: a foundation rail connected to the frame section, and having two side grooves formed on two side surfaces of the foundation rail, and a recess formed between the two side grooves; a sliding block having two side hangers extended into the two side grooves and slidably moving along the two side grooves, and a pivotal portion received in the recess; a clamp bolt having a pivotal end pivotally connected to the pivotal portion of the sliding block, and a thread end; a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing on the sliding block; and a turning handle rotatably and movably connected to the thread end of the clamp bolt, and having a push surface to smoothly abut against the first abutment flange of the plastic sleeve of the composite grip element, so as to control the engaging portion of the metal grip body of the composite grip element to stably engage with the side wall of the pick-up truck.

DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
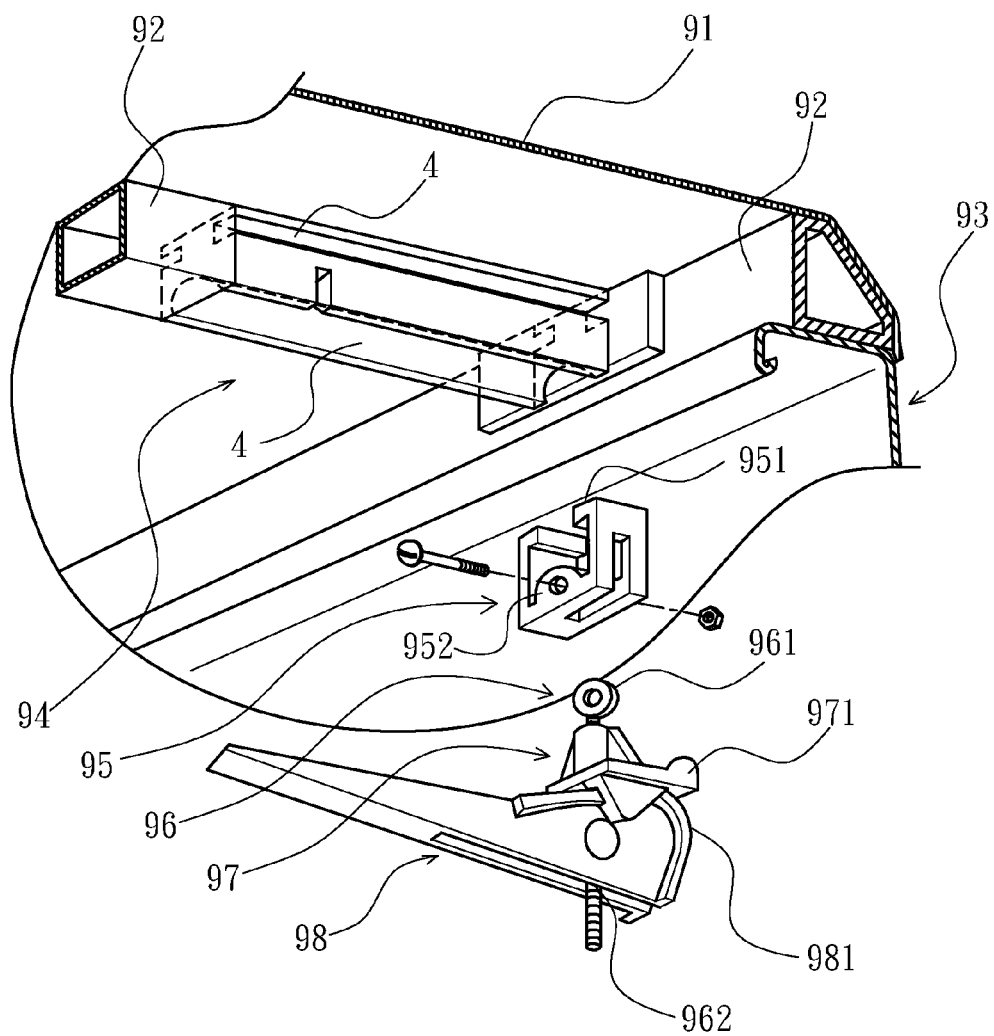
FIG. 1 is a partially enlarged view of a traditional clamp structure for the tonneau cover.
Figure 2:
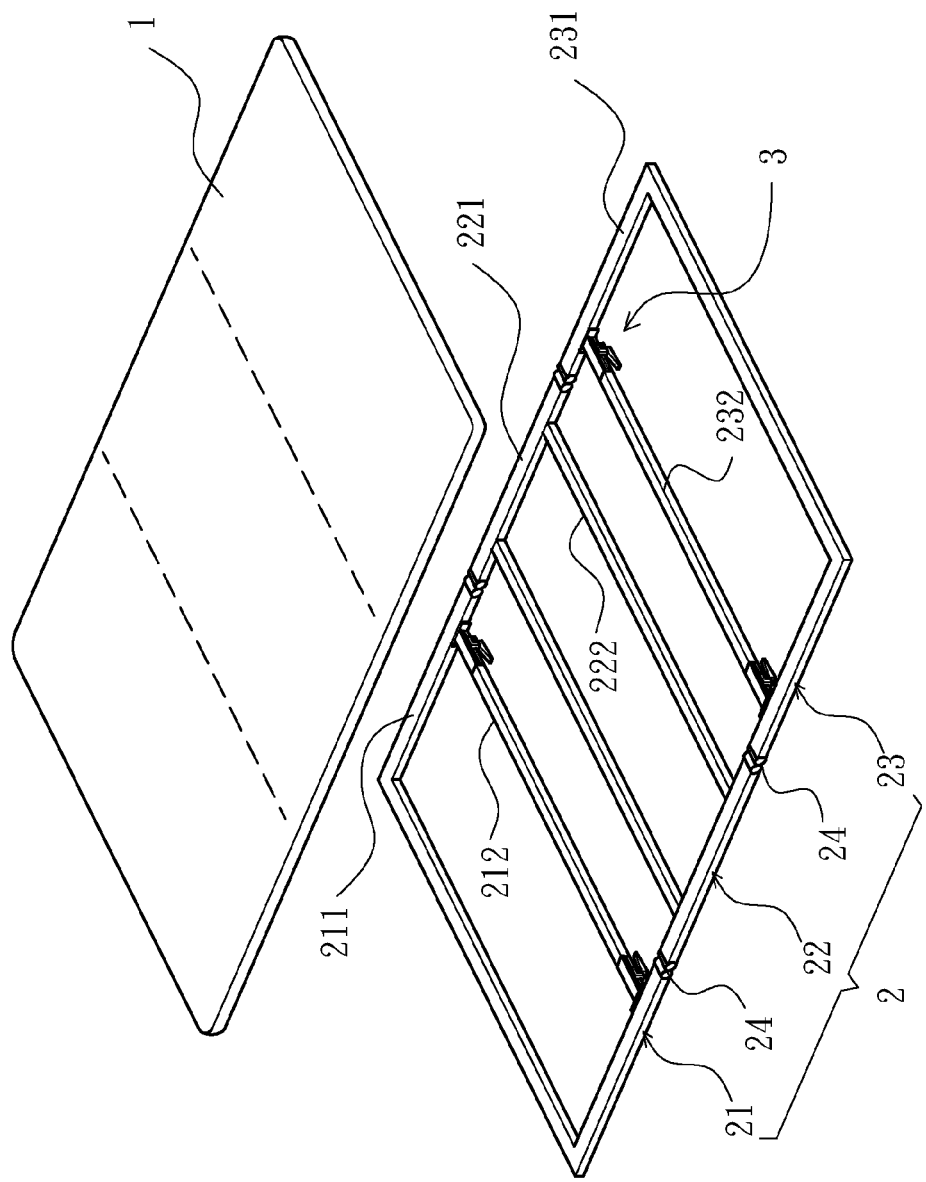
FIG. 2 is an exploded perspective view of a tonneau cover of a pick-up truck according to a preferred embodiment of the present invention.
Figure 3:
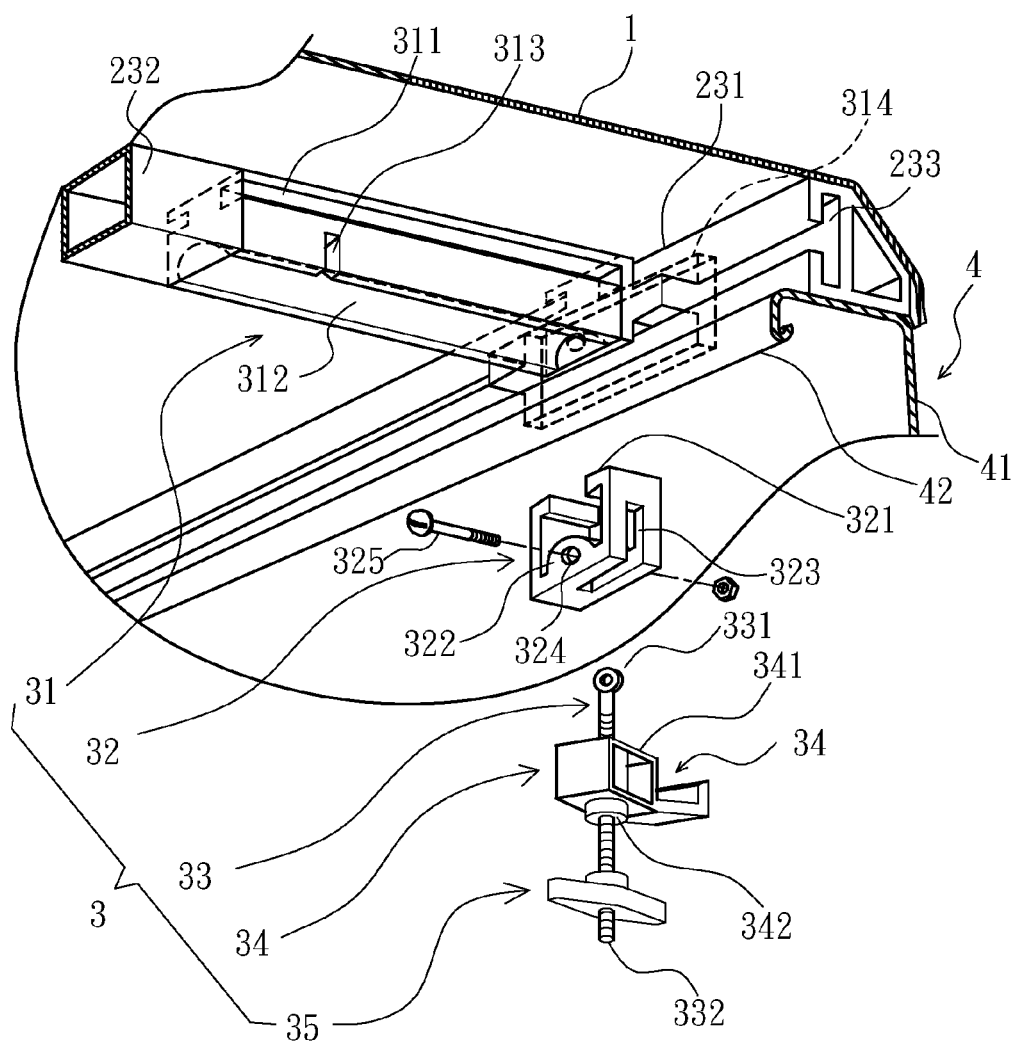
FIG. 3 is a partially enlarged view of a clamp structure for the tonneau cover according to the preferred embodiment of the present invention.
Figure 4:
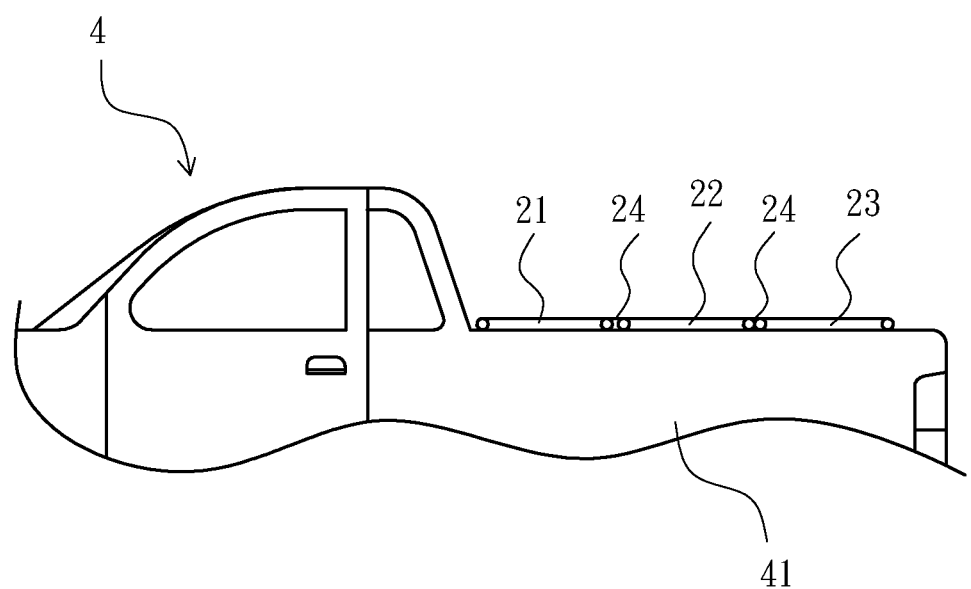
FIG. 4 is a schematic view of the tonneau cover in an extended position according to the preferred embodiment of the present invention.

Referring now to FIGS. 2 and 3, a tonneau cover and a clamp structure therefor according to a preferred embodiment of the present invention are illustrated. As shown, the tonneau cover comprises a flexible cover 1, a foldable frame 2 and at least one clamp structure 3. The tonneau cover is used to cover a cargo bed of a pick-up truck 4, as shown in FIG. 4, and releasably clamped to a flange surface 42 of at least one side wall 41 of the cargo bed by the clamp structure 3, so as to protect cargos carried in the cargo bed of the pick-up truck from adverse weather and improve the aesthetic appearance of the pick-up truck.

Referring to FIGS. 2 and 3, in the preferred embodiment of the present invention, the flexible cover 1 is made of flexible material, such as canvas, vinyl plastic, a weather-resistant fabric or other equivalent flexible material, but not limited thereto. The flexible cover 1 is suitable fixed on the foldable frame 2, and can be simultaneously folded when the foldable frame 2 is folded. The foldable frame 2 includes at least two frame sections and at least two hinges. For example, in the embodiment, the foldable frame 2 includes a first frame section 21, a second frame section 22, a third frame section 23 and two pairs of hinges 24. However, in other embodiment, the amount of the frame sections can be two, four or more than four, while the amount of the hinge can be varied according to the amount of the frame sections. The first frame section 21 mainly has a plurality of outer rails 211 and at least one inner rail 212, wherein the outer rails 211 define the outline of the first frame section 21, and the inner rail 212 is extended from left to right of the outer rails 211 to increase the supporting strength of the first frame section 21. Similarly, the second frame section 22 has a plurality of outer rails 221 and at least one inner rail 222, while the third frame section 22 has a plurality of outer rails 231 and at least one inner rail 232. All of the outer rails 211, 221, 231 and the inner rails 212, 222, 232 are selected from various rails made of metal (such as steel, stainless steel, copper, aluminum, equivalent rigid metal or alloy thereof), engineering plastic or even wood, while the cross-sectional shape thereof is preferably square, rectangular, circular or polygonal, without limitation. Furthermore, the outer rails 211, 221, 231 and the inner rails 212, 222, 232 can be installed in a detachable way or in an un-detachable way according to actual needs of the tonneau cover. Furthermore, it should be noted that the foldable frame 2 of the present invention may optionally include a single frame section, while the cover 1 can be flexible or rigid in an alternative embodiment (not shown).

Figure 3A:
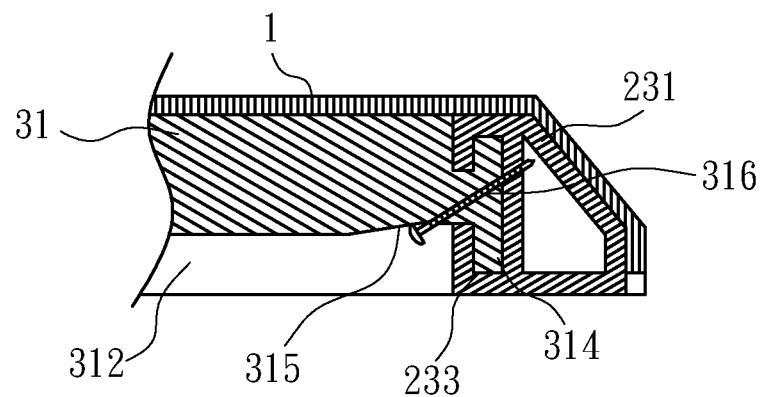
FIG. 3A is an exploded cross-sectional view of a foundation rail mounted on an outer rail in FIG. 3.

Referring now to FIGS. 2, 3 and 3A, in the preferred embodiment of the present invention, the clamp structure 3 can be optionally installed on at least one of the inner rails 212, 222, 232 and the outer rails 211, 221, 231. The clamp structure 3 comprises: a foundation rail 31, a sliding block 32, a clamp bolt 33, a composite grip element 34 and a turning handle 35. The foundation rail 31 has two side grooves 311 formed on two side surfaces of the foundation rail 31, and a recess 312 formed between the two side grooves 311. Each of the side grooves 311 is a dovetailed groove extended along each of the side surfaces of the foundation rail 31, having a narrow opening which will be described more detailed hereinafter. The recess 312 is formed on a lower surface of the foundation rail 31 between the two side surfaces, while the shape of the recess 312 is preferably semi-circular, curved, square, rectangular, or polygonal, without limitation. In addition, one of the side surfaces of the foundation rail 31 further comprises an indentation 313 which is communicated with the recess 312, and the clamp bolt 33 can be shifted into the indentation 313 to move to a storage position.

In the embodiment, the foundation rail 31 is a portion made of metal, engineering plastic or other equivalent rigid material and used to connect to a rail of one of the frame sections 21, 22, 23. For example, the foundation rail 31 is connected to the inner rail 232 of the third frame section 23 by means of welding, screw-connecting, inserting, engaging, or other possible connection method. Meanwhile, as shown in FIG. 3A, the foundation rail 31 has a T-shape insertion block 314 to be movably inserted into an insertion groove 233 of the outer rail 231 of the third frame section 23, and the recess 312 of the foundation rail 31 has an inclined depression 315 close to the T-shape insertion block 314, wherein a screw 316 is received in the inclined depression 315 and passes through the T-shape insertion block 314 to screw-connect to an inner surface of the insertion groove 233 of the third frame section 23, so that a quick installation can be carried out. In another embodiment, one end of the foundation rail 31 may be independently connected to the outer rail 231 of the third frame section 23, while the other end thereof will not be connected to the inner rail 232 (not-shown) but has a barrier block (not-shown) to limit the sliding of the sliding block 32. Alternatively, the foundation rail 31 also can be connected to the rearmost outer rail 231 of the third frame section 23 (or the frontmost outer rail 211 of the first frame section 21).

Figure 7:
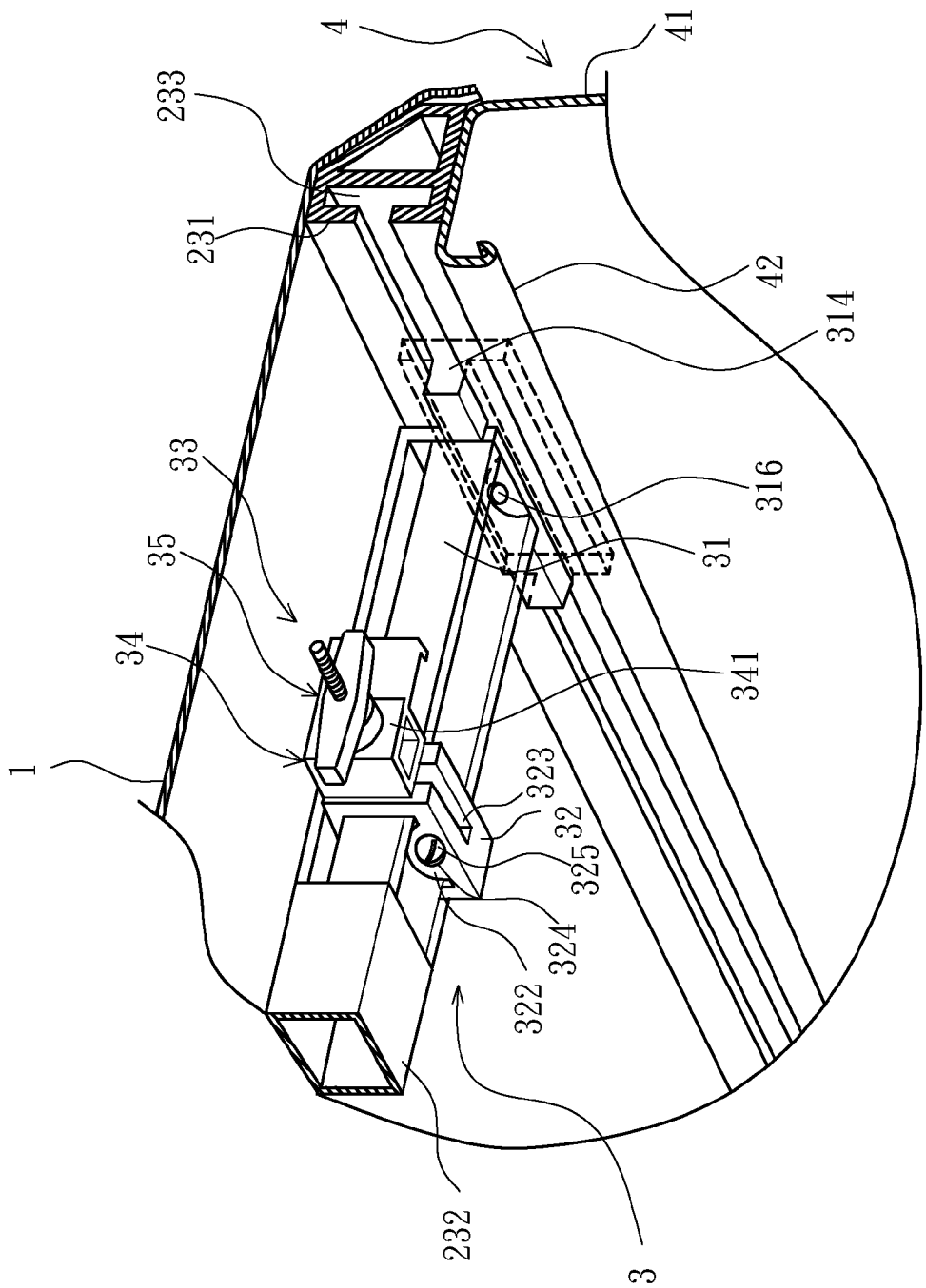
FIG. 7 is a perspective view of the clamp structure in a storage position according to the preferred embodiment of the present invention.

Referring still to FIG. 3, in the preferred embodiment of the present invention, the sliding block 32 is made of metal, engineering plastic or other equivalent rigid material, and has two side hangers 321 and a pivotal portion 322. The two side hangers 321 are formed on two opposite sides of the sliding block 32 and facing each other. Each of the two side hangers 321 is a dovetailed portion having an enlarged distal end, wherein the dovetailed shape of the side hangers 321 is corresponding to that of the side grooves 311, so that each of the two side hangers 321 can be extended into each of the two side grooves 311 and slidably move along the two side grooves 311 without departing from the side grooves 311. The pivotal portion 322 is an inner protrusion having a shape substantially corresponding to that of the recess 312 and having a size slight smaller than that of the recess 312. Thus, when the sliding block 32 is installed on the foundation rail 31, the pivotal portion 322 of the sliding block 32 can be received in the recess 312 of the foundation rail 31 without contacting an inner surface of the recess 312. In addition, the sliding block 32 further comprises a notch 323 which is extended from a lower surface of the sliding block 32 to one side surface thereof, a stepped through hole 324 passed through the pivotal portion 322 and communicated with the notch 323, and a pivotal element 325 extended through the stepped through hole 324 to pivotally connect the clamp bolt 33 to the pivotal portion 322, wherein the pivotal element 325 can include a screw and a nut. When the clamp structure is in the storage position, the notch 323 of the sliding block 32 is aligned with the indentation 313 of the foundation rail 31, so that the clamp bolt 33 can be shifted into the notch 323 and the indentation 313 to move to its storage position, as shown in FIG. 7.

Figure 3B:
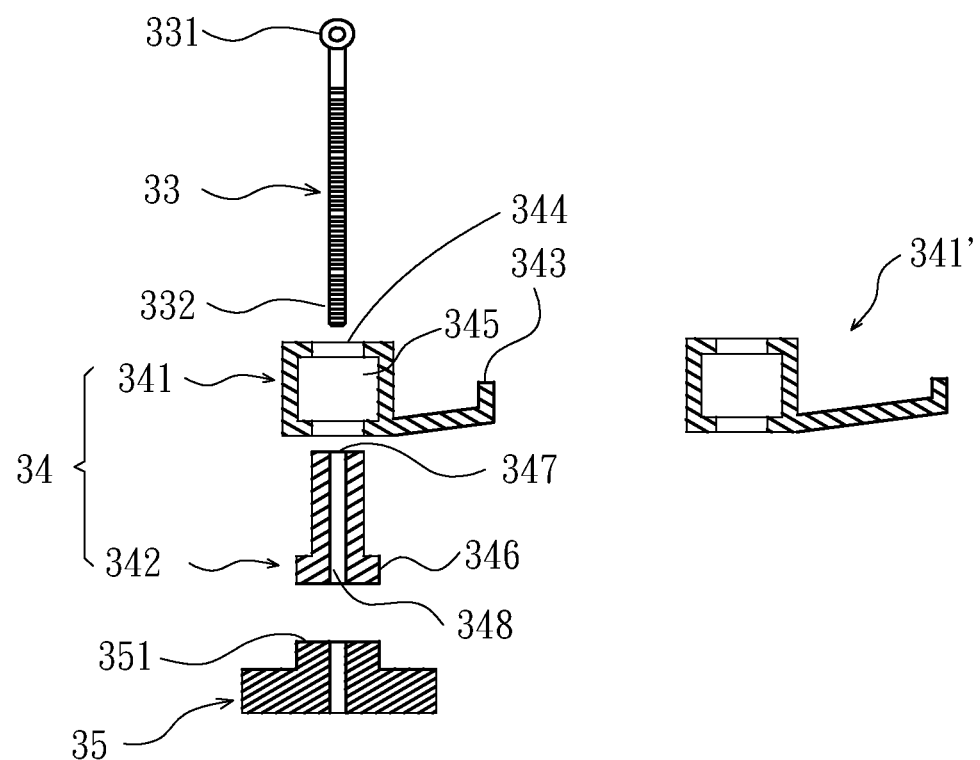
FIG. 3B is an exploded cross-sectional view of the clamp structure in FIG. 3.

Referring still to FIGS. 3 and 3B, in the preferred embodiment of the present invention, the clamp bolt 33 is preferably made of metal, such as stainless steel, iron, copper, aluminum or alloy thereof. The clamp bolt 33 has a pivotal end 331 and a thread end 332. The pivotal end 331 preferably has a pivotal hole which is inserted into the notch 323 and aligned with the stepped through hole 324, so that the pivotal element 325 can extend through the stepped through hole 324 and the pivotal end 331 to pivotally connect the clamp bolt 33 on the pivotal portion 322. Thus, the clamp bolt 33 can rotate in relation to the pivotal portion 322 along the notch 323. Similarly, the thread end 332 is the other end of the clamp bolt 33 opposite to the pivotal end 331, and used to screw-connect to the turning handle 35 which can be rotatable along the thread end 332. Thus, the actual position of the turning handle 35 on the thread end 332 can be adjusted during operation.

Referring now to FIGS. 3 and 3B, in the preferred embodiment of the present invention, the composite grip element 34 comprises a metal grip body 341 and a plastic sleeve 342, wherein the metal grip body 341 is made of rigid metal or alloy, such as aluminum or aluminum-based alloy; and the plastic sleeve 342 is made of plastic material, such as various engineering plastic, mainly including polyamide 6 (PA6), polyamide 66 (PA66), polypropylene (PP), acrylonitrile-butadiene-styrene (ABS) copolymer, polycarbonate (PC), polybutylene terephthalate (PBT) and etc. The metal grip body 341 is formed with an engaging portion 343, an installation hole 344 and a hollow portion 345, while the plastic sleeve 342 is formed with a first abutment flange 346, a second abutment end 347 and a passage 348. In installation, the plastic sleeve 342 passes through the installation hole 344 of the metal grip body 341, wherein the first abutment flange 346 of the plastic sleeve 342 is disposed a first outer side of the installation hole 344 of the metal grip body 341, while the second abutment end 347 of the plastic sleeve 342 is disposed a second outer side of the installation hole 344. The hollow portion 345 is transversely formed in the metal grip body 341 and communicated with the installation hole 344, and the plastic sleeve 342 actually passes through the installation hole 344 and the hollow portion 345, wherein the hollow portion 345 provides a certain slightly elastically deformable property to the metal grip body 341, so as to prevent from generating excess engagement force toward the flange surface 42 of the side wall 41 of the pick-up truck 4 to avoid the abrasion of the flange surface 42 and the engaging portion 343.

Figure 5:
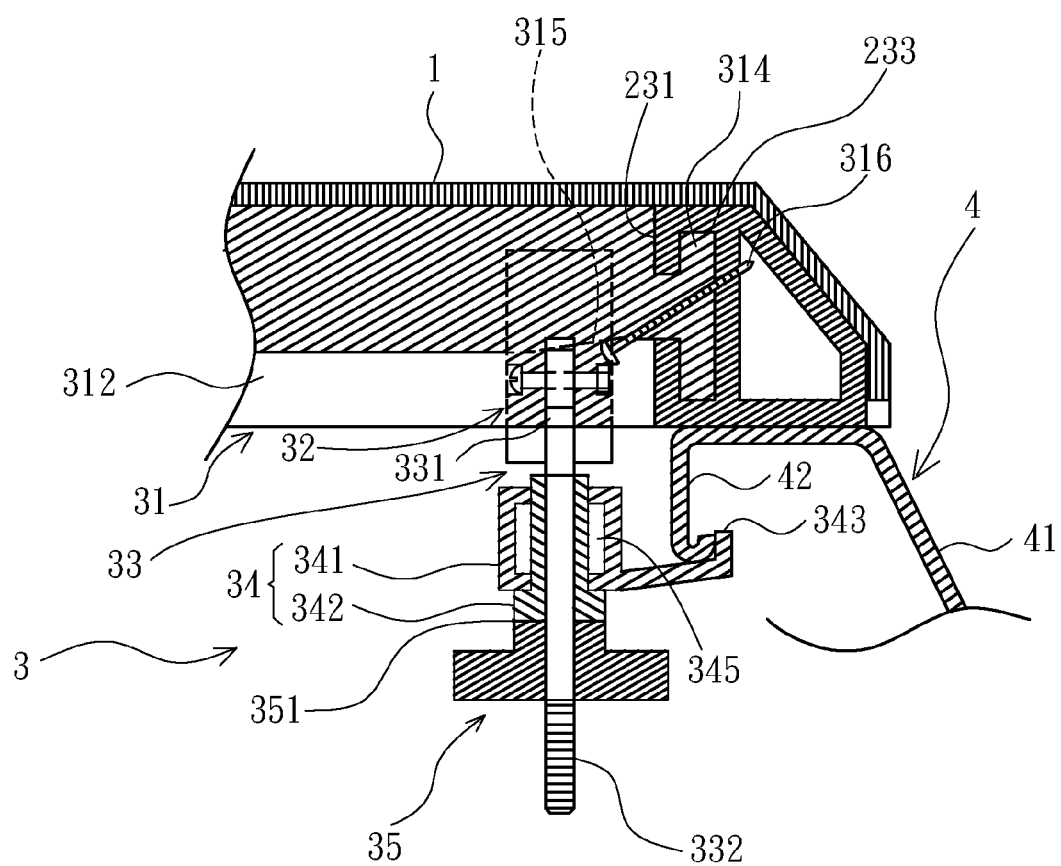
FIG. 5 is a side view of the clamp structure after clamping to the side wall of the pick-up truck according to the preferred embodiment of the present invention.

Furthermore, as shown in FIGS. 3 and 3B, the thread end 332 of the clamp bolt 33 can extend through the passage 348 of the plastic sleeve 342 of the composite grip element 34, so that the composite grip element 34 can be movably mounted on the thread end 332 of the clamp bolt 33. The first abutment flange 346 of the plastic sleeve 342 faces the turning handle 35, while the second abutment end 347 of the plastic sleeve 342 faces the sliding block 32. In the preferred embodiment of the present invention, the turning handle 35 is rotatably and movably screw-connected to the thread end 332 of the clamp bolt 33. The turning handle 35 has a push surface 351. When the turning handle 35 is manually turned, the push surface 351 can be moved up to smoothly abut against the first abutment flange 346 of the plastic sleeve 342 of the composite grip element 34, so as to control the engaging portion 343 of the thread end 332 of the composite grip element 34 to stably engage with a side wall 41 of the pick-up truck 4 (as shown in FIG. 5). Furthermore, during operation, the second abutment end 347 of the plastic sleeve 342 can be slight in contact with the surface of the sliding block 32 and smoothly slide across the sliding block 32, while the second abutment end 347 of the plastic sleeve 342 of the composite grip element 34 has a width greater than that of the notch 323 of the sliding block 32, and thus the second abutment end 347 can smoothly slide along a surface edge of the notch 323 of the sliding block 32. As a result, it can prevent the metal surface of the metal grip body 341 from being directly in contact with the surface of the sliding block 32 to cause harsh noise or surface abrasion.

Besides, as shown in FIG. 3B, if necessary, the composite grip element 34 has a backup metal grip body 341' having an engaging portion with a size different from that of the engaging portion 343 of the original metal grip body 341, and the metal grip body 341 can be replaced by the backup metal grip body 341'.

Referring now to FIGS. 4 and 5, in the preferred embodiment of the present invention, when the tonneau cover having three frame sections 21, 22, 23 is used in the extended position, the clamp structure 3 of the present invention, as shown in FIGS. 3 and 3B, can be used to lock the tonneau cover on the flange surface 42 of the side wall 41 of the cargo bed of the pick-up truck 4. Firstly, a user can manually hold the turning handle 35 to move the assembly of the sliding block 32, the clamp bolt 33, the composite grip element 34 and the turning handle 35, and thus the sliding block 32 will slide along an extended direction of the foundation rail 31, wherein each of the two side hangers 321 can be extended into each of the two side grooves 311 and slidably move along the two side grooves 311 without departing from the side grooves 311 due to the dovetailed shape of the side hangers 321 and the side grooves 311. During the sliding operation, the pivotal portion 322 of the sliding block 32 can be received in the recess 312 of the foundation rail 31 without contacting the inner surface of the recess 312. When the engaging portion 343 of the metal grip body 341 of the composite grip element 34 is moved to a locking position, the turning handle 35 can be manually turned in related to the thread end 332 of the clamp bolt 33, until the push surface 351 of the turning handle 35 abuts against the first abutment flange 346 of the plastic sleeve 342 of the composite grip element 34, so as to vertically move the engaging portion 343 of the metal grip body 341 to engage with the flange surface 42 of the side wall 41 of the pick-up truck 4, as shown in FIGS. 4 and 5.

Figure 6:
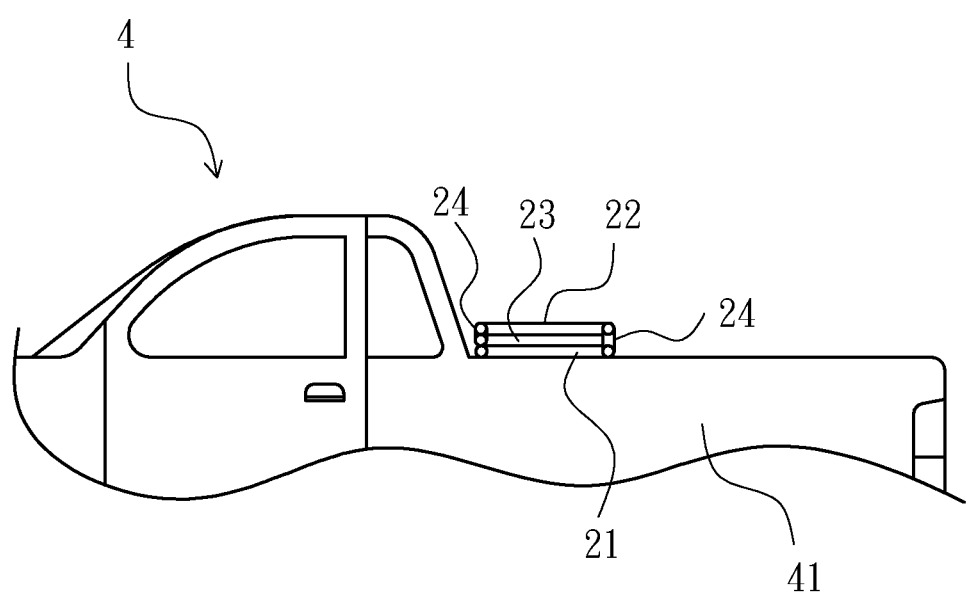
FIG. 6 is a schematic view of the tonneau cover in a storage position according to the preferred embodiment of the present invention.

Referring now to FIGS. 6 and 7, in the preferred embodiment of the present invention, when the tonneau cover is folded into a storage position (i.e. a closed position), the clamp structure 3 of the present invention, as shown in FIGS. 3 and 3B, can be shifted into its storage position under the tonneau cover. Firstly, a user can manually hold the turning handle 35 to move the assembly of the sliding block 32, the clamp bolt 33, the composite grip element 34 and the turning handle 35, and thus the sliding block 32 will slide along an extended direction of the foundation rail 31, until the notch 323 of the sliding block 32 is aligned with the indentation 313 of the foundation rail 31. Then, the clamp bolt 33 can be shifted into the notch 323 and the indentation 313 in relation to the pivotal end 331 thereof, so as to move the clamp structure 3 to the storage position. During the clamp bolt 33 is shifted, the second abutment end 347 can smoothly slide along the surface edge of the notch 323 of the sliding block 32 (or may not directly in contact therewith), so as to prevent the metal surface of the metal grip body 341 from being directly in contact with the surface of the sliding block 32 to cause harsh noise or surface abrasion. In the storage position, the turning handle 35 can be manually turned in relation to the thread end 332 of the clamp bolt 33, so that the push surface 351 of the turning handle 35 abuts against the first abutment flange 346 of the plastic sleeve 342 of the composite grip element 34 to vertically move the second abutment end 347 of the plastic sleeve 342 of the composite grip element 34 to engage with one side surface of the sliding block 32 (i.e. the surface edge of the notch 323). Therefore, the clamp structure 3 can be firmly positioned in the storage position without vibration, so as to ensure the operational reliability of the clamp structure 3.

As described above, the present invention provides a clamp structure 3 for a tonneau cover of the pick-up truck 4, wherein the clamp structure 3 has the composite grip element 34 which comprises the metal grip body 341 and the plastic sleeve 342, wherein the metal grip body 341 has the engaging portion 343 to stably engage with the flange surface 42 of the side wall 41 of the pick-up truck 4, and the plastic sleeve 342 has the first abutment flange 346 to smoothly abut against the turning handle 35 and the second abutment end 347 to smoothly slide on the sliding block 32. Thus, the composite grip element 34 can provide advantages of both of metal and plastic material, so that the operational stability and reliability of the clamp structure 3 can be enhanced, and the lifetime thereof can be elongated. Furthermore, the second abutment end 347 of the plastic sleeve 342 of the composite grip element 34 has a width greater than that of the notch 323 of the sliding block 32, and thus the second abutment end 347 of the plastic sleeve 342 smoothly slides along a surface edge of the notch 323 of the sliding block 32, so as to prevent the metal surface of the metal grip body 341 from being directly in contact with the surface of the sliding block 32 to cause harsh noise or surface abrasion.

Moreover, the hollow portion 345 of the metal grip body 341 is transversely formed in the metal grip body 341 and communicated with the installation hole 344, and the plastic sleeve 342 actually passes through the installation hole 344 and the hollow portion 345, wherein the hollow portion 345 provides a certain slightly elastically deformable property to the metal grip body 341, so as to prevent from generating excess engagement force toward the flange surface 42 of the side wall 41 of the pick-up truck 4 to avoid the abrasion of the flange surface 42 and the engaging portion 343. In addition, the original composite grip element 34 can be easily replaced by another backup composite grip element having a backup metal grip body 341' with a different specification, so that the clamp structure 3 can be rapidly changed and applied to a side wall of another pick-up truck with the different specification. Thus, the application flexibility of the clamp structure 3 can be expanded. Besides, the foundation rail 31 has a T-shape insertion block 314 to be movably inserted into an insertion groove 233 of the outer rail 231 of the third frame section 23, and the recess 312 of the foundation rail 31 has an inclined depression 315 close to the T-shape insertion block 314, wherein a screw 316 is received in the inclined depression 315 and passes through the T-shape insertion block 314 to screw-connect to an inner surface of the insertion groove 233 of the third frame section 23, so that a quick installation can be carried out.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A clamp structure for a tonneau cover of a pick-up truck, mounted to one of at least two frame sections of the tonneau cover to releasably secure the frame sections on a side wall of a cargo bed of the pick-up truck, the clamp structure comprising:
    a foundation rail connected to one of the frame sections, and having two side grooves formed on two side surfaces of the foundation rail, and a recess formed between the two side grooves;
    a sliding block having two side hangers extended into the two side grooves and slidably moving along the two side grooves, and a pivotal portion received in the recess;
    a clamp bolt having a pivotal end pivotally connected to the pivotal portion of the sliding block, and a thread end;
    a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing the sliding block, wherein the metal grip body has a hollow portion transversely communicated with the installation hole, and the plastic sleeve passes through the installation hole and the hollow portion; and
    a turning handle rotatably and movably connected to the thread end of the clamp bolt, and having a push surface to smoothly abut against the first abutment flange of the plastic sleeve of the composite grip element, so as to control the engaging portion of the metal grip body of the composite grip element to stably engage with the side wall of the pick-up truck.

2. The clamp structure according to claim 1, wherein the sliding block further comprises a notch which is extended from a lower surface of the sliding block to one side surface thereof, and the clamp bolt can be shifted into the notch to move to a storage position.

3. The clamp structure according to claim 2, wherein the second abutment end of the plastic sleeve of the composite grip element has a width greater than that of the notch of the sliding block, and thus the second abutment end of the plastic sleeve smoothly slides along a surface edge of the notch of the sliding block.

4. The clamp structure according to claim 2, wherein one of the side surfaces of the foundation rail further comprises an indentation which is communicated with the recess, and the clamp bolt can be shifted into the indentation to move to the storage position.

5. The clamp structure according to claim 4, wherein the notch of the sliding block is aligned with the indentation of the foundation rail when the clamp structure is in the storage position; and the pivotal portion of the sliding block is received in the recess of the foundation rail without contacting an inner surface of the recess.

6. The clamp structure according to claim 1, wherein the composite grip element has a backup metal grip body having an engaging portion with a size different from that of the engaging portion of the metal grip body, and the metal grip body can be replaced by the backup metal grip body.

7. The clamp structure according to claim 1, wherein the foundation rail is connected to an outer rail of one of the frame sections and has a T-shape insertion block to be movably inserted into an insertion groove of the outer rail; and the recess of the foundation rail has an inclined depression close to the T-shape insertion block, wherein a screw is received in the inclined depression and passes through the T-shape insertion block to screw-connect to an inner surface of the insertion groove of the outer rail.

8. A clamp structure for a tonneau cover of a pick-up truck, mounted to a single frame section of the tonneau cover to releasably secure the frame section on a side wall of a cargo bed of the pick-up truck, the clamp structure comprising:
    a foundation rail connected to the frame section, and having two side grooves formed on two side surfaces of the foundation rail, and a recess formed between the two side grooves;
    a sliding block having two side hangers extended into the two side grooves and slidably moving along the two side grooves, and a pivotal portion received in the recess;

a clamp bolt having a pivotal end pivotally connected to the pivotal portion of the sliding block, and a thread end;

a composite grip element movably mounted on the clamp bolt, and having a metal grip body which is formed with an engaging portion and an installation hole and a plastic sleeve which passes through the installation hole of the metal grip body and is formed with a first abutment flange and a second abutment end facing on the sliding block, wherein the metal grip body has a hollow portion transversely communicated with the installation hole, and the plastic sleeve passes through the installation hole and the hollow portion; and a turning handle rotatably and movably connected to the thread end of the clamp bolt, and having a push surface to smoothly abut against the first abutment flange of the plastic sleeve of the composite grip element, so as to control the engaging portion of the metal grip body of the composite grip element to stably engage with the side wall of the pick-up truck.

9. The clamp structure according to claim 8, wherein the sliding block further comprises a notch which is extended from a lower surface of the sliding block to one side surface thereof, and the clamp bolt can be shifted into the notch to move to a storage position.

10. The clamp structure according to claim 9, wherein the second abutment end of the plastic sleeve of the composite grip element has a width greater than that of the notch of the sliding block, and thus the second abutment end of the plastic sleeve smoothly slides along a surface edge of the notch of the sliding block.

11. The clamp structure according to claim 9, wherein one of the side surfaces of the foundation rail further comprises an indentation which is communicated with the recess, and the clamp bolt can be shifted into the indentation to move to the storage position.

12. The clamp structure according to claim 11, wherein the notch of the sliding block is aligned with the indentation of the foundation rail when the clamp structure is in the storage position; and the pivotal portion of the sliding block is received in the recess of the foundation rail without contacting an inner surface of the recess.

13. The clamp structure according to claim 8, wherein the composite grip element has a backup metal grip body having an engaging portion with a size different from that of the engaging portion of the metal grip body, and the metal grip body can be replaced by the backup metal grip body.

14. The clamp structure according to claim 8, wherein the foundation rail is connected to an outer rail of the frame section and has a T-shape insertion block to be movably inserted into an insertion groove of the outer rail; and the recess of the foundation rail has an inclined depression close to the T-shape insertion block, wherein a screw is received in the inclined depression and passes through the T-shape insertion block to screw-connect to an inner surface of the insertion groove of the outer rail.

* * * * *